United States Patent
Benyamin

(10) Patent No.: US 7,842,876 B2
(45) Date of Patent: Nov. 30, 2010

(54) MULTIMEDIA OBJECT GROUPING, SELECTION, AND PLAYBACK SYSTEM

(75) Inventor: Daniel Benyamin, Los Angeles, CA (US)

(73) Assignee: Harman International Industries, Incorporated, Northridge, CA (US)

( * ) Notice: Subject to any disclaimer, the term of this patent is extended or adjusted under 35 U.S.C. 154(b) by 692 days.

(21) Appl. No.: 11/650,033

(22) Filed: Jan. 5, 2007

(65) Prior Publication Data

US 2008/0168390 A1 Jul. 10, 2008

(51) Int. Cl.
G10H 7/00 (2006.01)
G10H 1/18 (2006.01)
G10H 1/00 (2006.01)
H04Q 1/00 (2006.01)

(52) U.S. Cl. ..................................................... 84/615

(58) Field of Classification Search ................. 84/600, 84/615
See application file for complete search history.

(56) References Cited

U.S. PATENT DOCUMENTS

| | | | |
|---|---|---|---|
| 6,539,395 B1 * | 3/2003 | Gjerdingen et al. ......... 707/102 |
| 6,731,312 B2 | 5/2004 | Robbin | |
| 7,249,124 B2 * | 7/2007 | Sasaki et al. ................... 707/3 |
| 7,268,288 B2 * | 9/2007 | Yamane et al. ............... 84/615 |
| 7,340,455 B2 * | 3/2008 | Platt et al. ....................... 707/3 |
| 7,571,183 B2 * | 8/2009 | Renshaw et al. ............ 707/102 |
| 2006/0026588 A1 | 2/2006 | Illowsky et al. | |
| 2006/0112098 A1 * | 5/2006 | Renshaw et al. ............... 707/7 |
| 2006/0184538 A1 | 8/2006 | Randall et al. | |
| 2006/0242139 A1 | 10/2006 | Butterfield et al. | |
| 2007/0119288 A1 * | 5/2007 | Makino ....................... 84/602 |
| 2009/0069914 A1 * | 3/2009 | Kemp et al. ................... 700/94 |

* cited by examiner

Primary Examiner—Jeffrey Donels

(57) ABSTRACT

A multimedia organization and playback system intelligently organizes media objects, such as music files, and plays back their contents. The system considers and analyzes multiple media object attributes to determine groups of similar songs. As a result, the system delivers a consistent selection of media to the listener despite wide variations in media characteristics and without overburdening the listener with complicated configuration input. The listener may play back grouped songs based on the similarities between songs. Successive selections may be more or less similar to a current selection based on the organization of the music objects.

34 Claims, 13 Drawing Sheets

MULTIMEDIA OBJECT GROUPING, SELECTION, AND PLAYBACK SYSTEM

BACKGROUND OF THE INVENTION

1. Technical Field

The present invention relates to a multimedia object organization and playback system. In particular, the present invention relates to a multimedia object organization and playback system that groups objects heuristically and allows playback based on similarities between the grouped objects.

2. Related Art

Enormous growth in digital technology has given rise to vast collections of information, including music and multimedia objects, such as files and data streams; phone, personal, or restaurant contacts; news articles; photographs; and many other types of data files. For example, fast processors, Internet music stores, and almost boundless and inexpensive data storage have given the everyday individual the ability to build an extensive digital collection of music. At the same time, advanced music players have taken on the challenge of providing convenient access to the hundreds or thousands of songs that may be in such a collection.

Music objects may be organized based on pre-defined or user-defined designations, such as an artist, album, or genre of the music. For example, MP3 or other music object types may include ID3 tags associated with the music object. The organized music objects may be stored in playlists based on the designations, and may be transferred to music players and played back based on the playlist or designation.

The user interface on a music playback device typically displays a list of tagged objects stored or available on the device. However, the user interface typically presents only simplified views of the objects, such as displaying the entire list of objects, or lists of objects restricted by a limiting selection. For example, the objects may be displayed in alphabetical order, or displayed according to a genre or artist selection. Once the objects are tagged or catalogued, the listener may decide what objects to listen to using the user interface.

Listeners may be interested in playing a small number of groups of music, where each group is similar by some musical or psychological attribute. Conventional user interface applications for data object lists do not allow groupings of objects other than by pre-defined designations and categories. Other limited playback features may also be present. As one example, the user interface may permit a listener to select random shuffle playback. Another option often provided is to permit playback from a manually defined and entered playlist of songs. In other words, conventional user interfaces provided insufficient playback flexibility in many situations. The explosive growth of digital music collections exacerbates this problem.

Therefore a need exists for a system that allows grouping of objects based on heuristic characteristics and allows playback of music objects based on such a grouping to improve the music selection and playback experience.

SUMMARY

A multimedia organization and playback system intelligently organizes information and delivers the information on request. The information may be present in virtually any type of storage mechanism, including music files, streaming music objects, address entries, video objects, telephone contacts, restaurant selections or other types of objects. In the context of a music object organization and playback system, for example, the system may intelligently deliver a selection of music to the listener in which each song is chosen to be consistent with the last song, or more or less similar to the last song.

A music object organization system assigns music objects to groups based on heuristic characteristic of the music objects. The music object organization system determines music object groups based on a music object characteristic, such as a genre, album, artist, or music object length. The music object organization system identifies a heuristic distance measure applicable to the music objects, and assigns the music objects among the music object groups to satisfy a clustering criterion, such as a minimization of the heuristic distance measures between music objects within the music object groups.

A music object playback system that may be used with the music object organization system presents a music object group as a selectable "channel" to the listener. The music object group may be organized based on a music object characteristic associated with the music objects. The system organizes the music object groups such that a heuristic distance measure between the music objects satisfies a clustering criterion, such as a minimization of the heuristic distance measures between music objects within the music object groups. The music object playback system determines which music objects are candidates for selection as the next music object to play from the music object group by adjusting a next music object selection space based on a maximum heuristic distance measure. Then, actual selection is at random, in alphabetical order, by track length order, or by any other selection criteria in the space. A listener may select a music object that is "more like" a currently playing music object, in which case the system reduces the next music object selection space. The listener may also select a music object that is "less like" the currently playing music object, in which case the system expands the next music object selection space.

A graphical user interface for the system presents a "more like this" user interface element through which an operator reduces a next music object selection space, to select a next music object that is "more like" the currently playing music object. A "less like this" user interface element is also presented, through which an operator expands the next music object selection search space. The operator may select a next music object that is "less like" the currently playing music object using the "less like this" user interface element.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Music listeners may not desire to listen to a musical collection as a random collection of tracks. Music listeners may be interested in listening to one of a small number of groups of music, where each group is similar by some attribute, such as a musical or psychological attribute. Listeners may desire to organize a music collection based on heuristic music object characteristics associated with the music objects in the music collection, such as by grouping music objects that are more similar to each other than to other groups of music objects. Such a heuristic grouping may allow a continuum of music object organization based on music object characteristics associated with the music objects.

Figure 1:
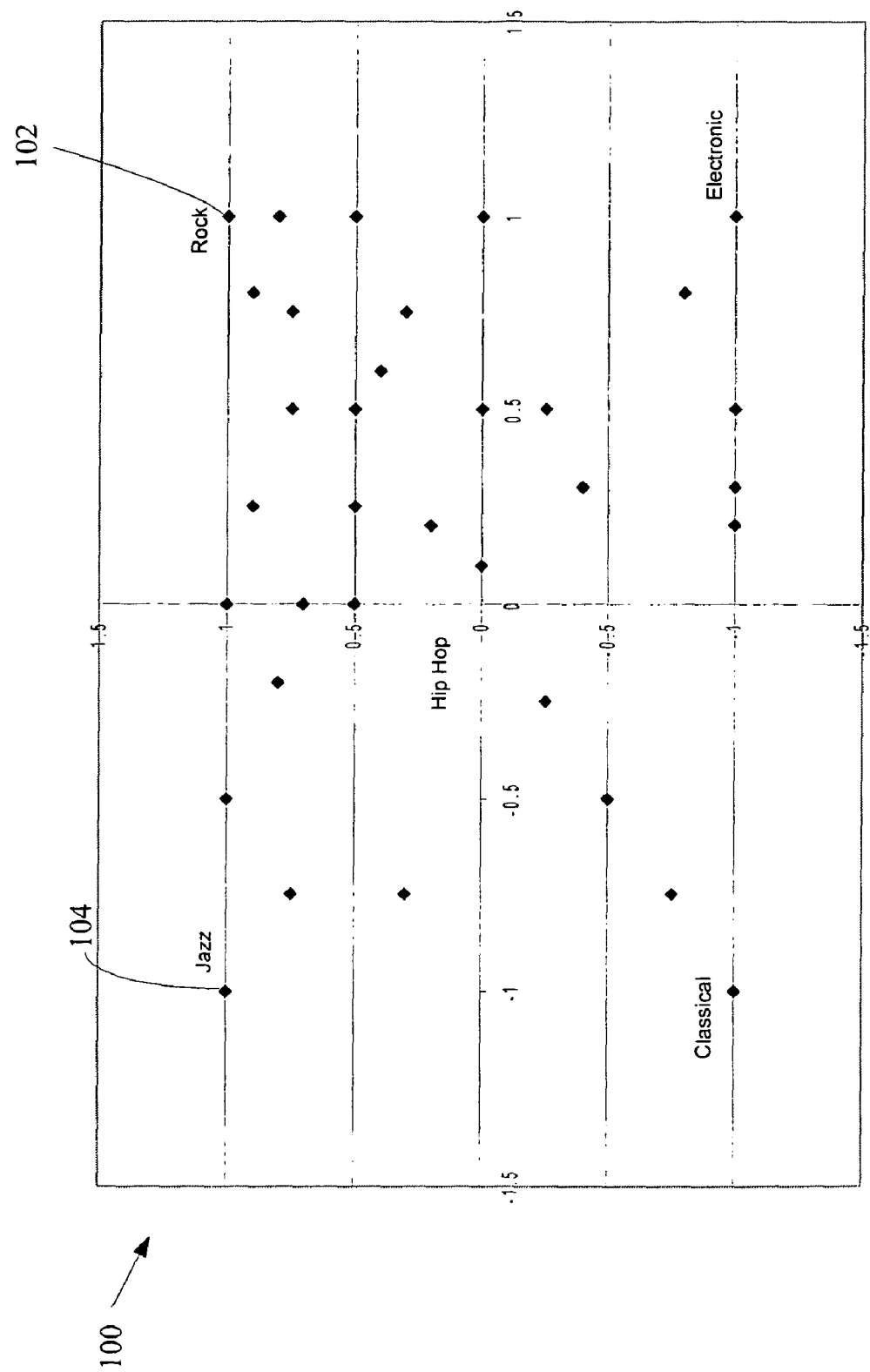
FIG. 1 is an example heuristic map of music objects.

FIG. 1 is an example heuristic map 100 of music objects. The map 100 locates music objects in an N-dimensional space, such as a vector space, starting with giving each music object a location in this space. Each axis of the N-dimensional space may be based on a music object characteristic, or combination of characteristics, associated with the music objects. The music objects may be represented in the vector space as ordered n-tuples, where n may be an integer greater than 0. Vectors in these spaces may be ordered "tuples" of real numbers. A pair of music objects, such as two classical music objects, may be located "close" to each other in the space, whereas another pair, such as a classical music object and punk rock music object, may be "far" from each other in the space.

One way of assigning locations to each music object may include determining or obtaining a genre tag of each music object, and comparing the information in the genre tag to a two-dimensional map of genres to locate the music object. For example, a "tag" object associated with the music objects may be processed, such as by extracting music object characteristics from an ID3 tag associated with the music object. The music object's resulting location may be related to the location of that genre on the map. For example, given the example heuristic map 100 shown in FIG. 1, a rock song 102 would have the location of (1,1), and a jazz song 104 would have the location of (−1,1). Other mappings are possible, including mappings of the music objects in more than two-dimensional space. For example, additional music object characteristics may include an artist, album, composer, music object length, beat-per-minute count, time period, and/or a user-defined characteristic for a music object. The music objects may adhere to the WAV, MP3, WMA, OOG, AAC, AIF, or other music object formats. The music objects may also include streaming objects such as satellite radio objects, streaming audio objects, objects stored on a server and streamed to a device, high definition radio objects, cellular-transmitted audio objects, or other audio objects streamed over a wired or wireless connection.

The heuristic map 100 may be determined by a listener's preferences and selection of music object characteristics. The listener may set locations for music objects within the heuristic map 100 as a pre-processing operation, or during operation using a graphical user interface (GUI). In some systems, one or more heuristic maps 100 may be pre-defined (e.g., as a system default heuristic map) and installed or loaded in a memory in the system at a factory or original equipment manufacturer (OEM) location. The system may receive operator input that switches between the currently active map during system operation. In other systems, an expert system may be configured to analyze the music objects and determine the heuristic map 100. The heuristic map 100 may be based on listener statistics, such as previously played music objects, ranked lists of music objects, subscriptions to music object services, and/or other behavioral statistics that may determine a heuristic map of music objects.

Figure 2:
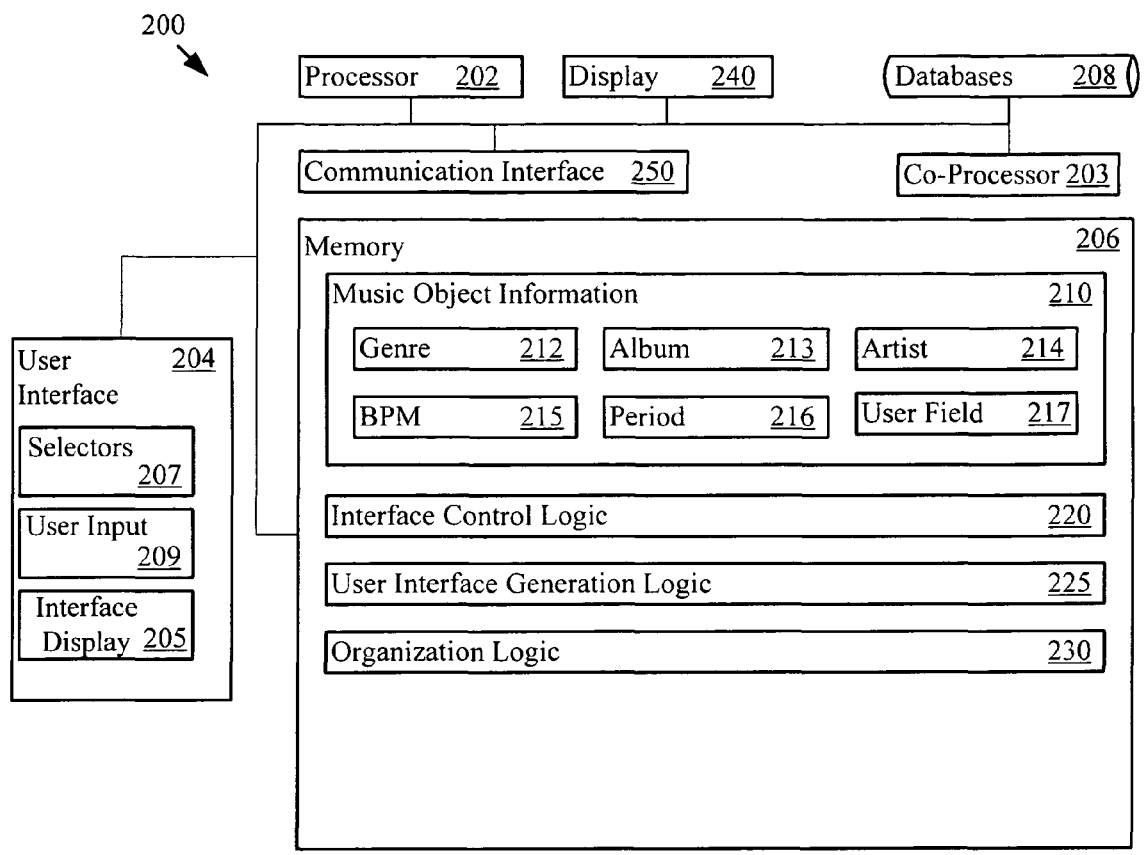
FIG. 2 is a music object organization system.

FIG. 2 illustrates an example music object organization system 200 ("system 200"). The system 200 may organize music objects based on a music object characteristic associated with the music objects to create heuristic groupings of music objects. The system 200 may present the heuristic groupings to a listener for selection. The system 200 includes a system processor 202, a system co-processor 203, and a user interface 204 configured to accept input and present output to a listener. The system 200 also includes a system memory 206, databases 208 configured to retain data related to system operation, a display 240, and a communications interface 250. As will be discussed in more detail below, the system processor 202 may execute music object organization logic 230 to organize the music objects based on the music object characteristic associated with the music objects, for example.

The system co-processor 203 may assist with the execution of instructions by the system processor 202. The system co-processor 203 may be implemented as a math co-processor to execute analysis or statistical programs associated with the music object grouping. The system co-processor 203 may be integral with the processor 202, or may be a separate processor.

The user interface 204 accepts input from a listener. A listener may desire to view a list of music objects, search the music objects, enter data for input to the system 200, select applications, play a music object, define new or modify existing heuristic maps, or take other desired actions. The user interface 204 may include an interface display 205 configured to display user interface elements for viewing and/or selection. The user interface 204 may include one or more selectors 207, such as buttons, actuable by the listener to select an action or to enter data. The user interface 204 may also include a user input logic 209. The user input logic 209 may include a mouse, keyboards, keypads, touchpads, styli, light pens, microphone inputs, wireless receivers, remote input, trackpads, trackballs, joysticks, track pointers, haptic modules, force-feedback modules, motion detectors, biomeasure input modules, and/or other input modules. The user interface 204 may be coupled wirelessly to the system 200, such as through a Bluetooth, infrared, WiFi, RF, cellular connection, and/or other wireless connection. Alternatively or additionally, the use r interface 204 may be coupled by a wired connection to the system 200, such as through an Ethernet, RCA, USB, Firewire, or other wired connection. In some systems, the user interface 204 may be integral with the system 200.

The system memory 206 may include a music object information database 210. The music object information database

210 may include data records related to the music objects, each data record containing fields together with a set of operations for searching, sorting, recombining, and/or other functions related to the fields and data records. For example, the music object information database 210 may retain the music object characteristics associated with the music objects such as a genre field 212, an album field 213, an artist field 214, a beats-per-minute field 215, a time period field 216, and/or a user field 217, such as a user-defined or user-configurable field. Additional, fewer, or different data records associated with the music objects may be stored in the memory 206. The music object information database 210 may store an ID3 tag or other metadata container associated with a music object. The music object information database 210 may be editable or may be locked or read-only.

The interface control logic 220 may include instructions that control and accept input from the user interface 204. The interface control logic 220 may process input from the selectors 207 or the input module 209 to control the system 200. The interface control logic 220 may include instructions to process actions selected through the user interface 204. For example, the interface control logic 220 may display a list of music objects available in the music object information database 210, or allow a listener to search or select a desired music object or group of music objects. In some systems, the interface control logic 220 accepts input from the user interface 204 to organize the music objects into groups based on the music object characteristics associated with the music objects.

The user interface generation logic 225 may include instructions that cause the user interface 204 to display user interface elements on the interface display 205 or the display 240. Examples of user interface elements include screen window panes, soft keys, touchscreen elements, soft buttons, scroll bars, dials, and/or other graphical interface elements. The instructions may be calls to graphical user interface libraries, draw primitives, graphical libraries, or other user interface element instructions.

The music object organization logic 230 may include instructions that organize the music objects into groups based on the music object characteristics associated with the music objects. The music object organization logic 230 may be implemented as processor executable instructions, executed by the system processor 202, to determine groups of music objects, such as at least a first group of music objects and a second group of music objects. These groups may represent the common listening styles preferred by the listener. The groups may be based on the heuristic map 100. The music object organization logic 230 may identify a heuristic distance measure applicable to the music files, such as a heuristic distance measure based on the heuristic map 100. The heuristic distance measure may be a function of the ordered n-tuples associated with the music objects in the vector space associated with the music object characteristics. For example, the heuristic distance measure may be defined as a geometric distance between the music objects in the vector space:

$$D_H = \sqrt{(x1 - x2)^2 + (y1 - y2)^2 + (z1 - z2)^2 + \ldots + (q1 - q2)^2} \quad \text{Eqn. 1}$$

where $D_H$ is the heuristic distance measure, $\{x1, y1, z1, \ldots q1\}$ may represent a location of a first music object in the vector space, and $\{x2, y2, z2, \ldots q2\}$ may represent a location of a second music object in the vector space. The music object organization logic 230 may determine the heuristic distance by determining an N-dimensional scalar magnitude of a vector between the music objects within a group. The heuristic distance measure may include a similarity measure between the music objects, where music objects with a smaller heuristic distance measure separating them may be considered "more similar." Other functions for $D_H$ may be possible, where coordinates of the ordered n-tuples are mapped from the music object characteristics. The music objects may be ordered in the heuristic map to form a vector space, where the music objects satisfy mathematical relations related to vector operations on the music objects.

The music object organization logic 230 may determine the groups by assigning each music object among at least the first music object group and the second music object group such that heuristic distance measures between the music objects satisfy a clustering criterion. In some systems, the clustering criterion comprises a minimization of the heuristic distance measures between the music objects within a group. The music object organization logic 230 may organize the music objects within a group such that an intra-group variance of the music objects is minimized.

The music object organization logic 230 may use an expectation-maximization process to group the music objects. The music object organization logic 230 may use a K-means process. The K-means process groups objects based on attributes, such as the music object characteristics, into k initial partitions. The music object organization logic 230 may determine a number k means of data generated from distributions (such as Gaussian distributions) of the music objects in the vector space. The music object organization logic 230 may minimize a total intra-group variance, or, a squared error function:

$$V = \sum_{i=1}^{k} \sum_{j \in S_i} |x_j - \mu_i|^2 \quad \text{Eqn. 2}$$

where there are k groups $S_i$, $i = 1, 2, \ldots, k$, and $\mu_i$ is the centroid or mean point of all the points $x_j \in S_i$. In the system 200, $x_j$ may represent a music object available for organization. The music object organization logic 230 may set the number of groups based on a determined music object characteristic, such as a pre-determined or user-determined number of groups. The music object organization logic 230 may set the number of groups based on the heuristic map 100. In some systems, the music object organization logic 230 may adjust the number of groups dynamically, such as by allowing an operator to set the number of groups.

The music object organization logic 230 partitions the input points into k initial groups, either at random or using some heuristic data. The music object organization logic 230 then calculates the mean point, or centroid, of each group. The music object organization logic 230 determines a new partition by associating each point, or music object, with a closest centroid. Then, the centroids are recalculated for the new groups. The music object organization logic 230 may repeat the process by alternate application of these two steps until convergence of the process is reached, which may be obtained when music objects no longer switch clusters (or alternatively, when centroids are no longer changed).

The music object organization logic 230 may store the groups of music objects, determined during the organization process, in the system memory 206. The system 200 may display the groups of music objects on the display 240. The listener may select a group for playback, view group characteristics, select a repeat of the organization process, and/or other actions.

The music object information 210 may additionally or alternatively be obtained from databases 208, through operator input at the user interface 204, through a communication interface 250 (e.g., through a network connection to a data warehouse, to equipment in the system 200, such as storage, server, computer, or to other logic) or from other sources. As examples, the databases 208 may be local or remote databases that store music object information, program module code means, or system music object characteristic information.

The system 200 may organize the music objects within the group so that all of the music objects are "close" to each other by a heuristic measure. For example, the system 200 may organize music objects that have a genre music object characteristic of "classical" within a group. Music objects that have a "classical" genre music object characteristic and that also have the same "album" music object characteristic and "artist" music object characteristic may be considered "closer" heuristically than music objects that have a "classical" genre and the same "artist" music object characteristic but have a different "album" music object characteristic. A listener may configure the system 200 to organize music objects closer within a group based on different music object characteristics. The listener may set the music object organization logic 230 to initially place the music objects within the groups. In some systems, the music object organization logic 230 may load a mapping template, such as the heuristic map 100, or a set of rules to place the music objects within the vector space.

Figure 3:
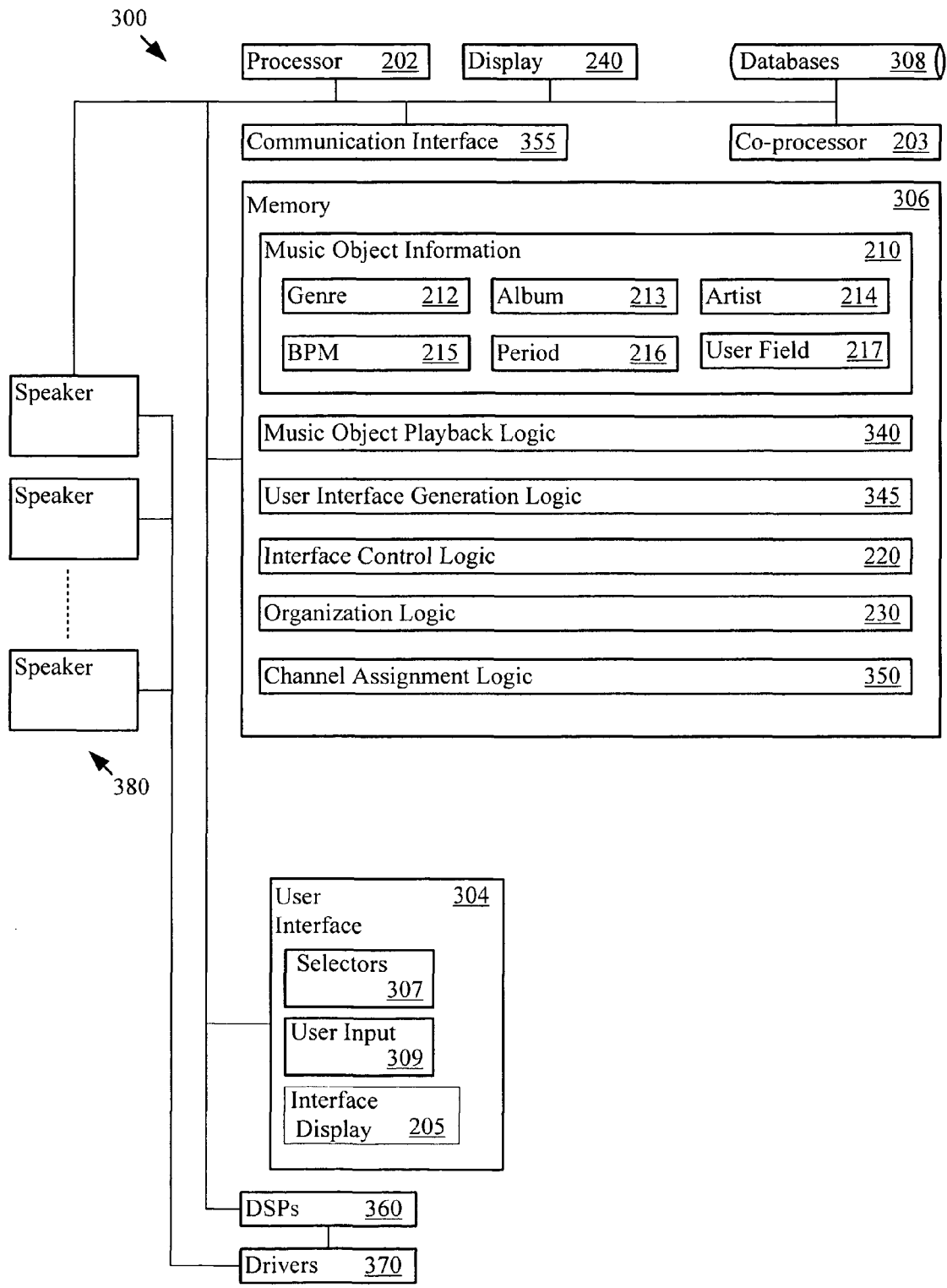
FIG. 3 is a music object playback system.

When the system 200 organizes the music objects into groups, the listener may play the music objects. FIG. 3 illustrates a music object playback system 300 ("system 300") that may present the organized groups to the listener and allow playback of a selected group of music objects. The music object playback system 300 may include a user interface 304, a system memory 306 configured to retain a music object playback logic 340, user interface generation logic 345, databases 308 that contain data related to the music object information and equipment information, and speakers 380. In FIG. 3, when the listener selects an action, such as by using the user interface 304, the system 300 may display the next music object on the display 240 and/or the interface display 305. The system 300 may play the next music object on the speakers 380.

The system 300 may present a list of groups of music objects to the listener as selectable "channels" to listen to. The user interface generation logic 345 may present the list of groups on the display 240 and/or the user interface 304. The system memory 306 may retain channel assignment logic 350 that maps the groups to channel names that the user interface 304 displays. The channel assignment logic 350 may assign channel names, such as Group 1->"Channel 1", Group 2->"Channel 2," etc. Other channel assignments may be possible, such as assignments based on the heuristic map 100, user selected channel mappings, or other assignments. The user interface generation logic 345 may be implemented as instructions that cause the interface display 205 and/or the display 240 to display user interface elements. The listener may select a group of music objects, and may select a music object from within the group for playback, using the user interface 304. Alternatively, the system 300 may randomly select a music object for playback when the listener selects a group. For example, the system 300 may randomly choose a starting music object with uniform probability from all the music objects in the group, and begin playback.

Once playback has begun, the system 300 may present the listener with playback controls that direct the system 300 to take specific actions. The listener may use the user interface 304, such as by actuating selectors 307 or other user input 309, to select an action. For example, the listener may activate a "track forward" control to direct the system 300 to play a next music object in the group. Other examples of playback controls include a "less similar" playback control and a "more similar" playback control. The listener may also allow the current music object to play to the end of track, "EOT."

The listener may also indicate to the system 300 that the listener desires to next hear a song that is "less like" or "less similar" to the current playing music object. In this case, the listener may desire a music object within the group that sounds less like the currently playing music object. A "less similar" song may be determined based on song characteristics such as album, artist, genre, beats-per-minute, music object length, time period, and/or a different user-defined field associated with the music object.

The listener may also indicate to the system 300 to select a music object within the group that sounds "more like" or is "more similar" to the current playing music object. Such a song may be determined based on song characteristics such as album, artist, genre, beats-per-minute, time period, music object length and/or a different user-defined associated with the music object.

The next music object may be chosen randomly from a set of music objects within a maximum heuristic distance measure from the current music object and within the current group. The maximum heuristic distance is chosen as a function of a heuristic distance scaling factor, K. The music object playback logic 340 may select a next music object to play from the group of objects by adjusting a next music object selection space based on the maximum heuristic distance measure. The next music object selection space may encompass a subset of music objects in the selected group that the music object playback logic 340 may select from based on the maximum heuristic distance measure.

The music object playback logic 340 may determine a uniform random variable X. The music object playback logic 340 may use a random number generator, a look-up table, or other logic to determine the uniform random variable X. The music object playback logic 340 determines the heuristic distance scaling factor K, where K may be based on a value retained in the system memory 304, the databases 308, from listener input, or from a program executed by the processor 202. The maximum heuristic distance measure D may be determined by the following equation:

$$D(X, K) = \sqrt{\frac{(100 - X)}{K}} \qquad \text{Eqn. 3}$$

The system 300 may implement other maximum heuristic distance measure functions.

The system 300 may also include special purpose processors. For example, one or more Digital Signal Processors (DSPs) 360 may be provided. The DSPs 360 may digitally manipulate signal samples that determine the sound output from one or more speaker system speakers 380, including applying signal processing algorithms or taking other processing steps. The DSPs 360 may interface with driver logic 370, such as pre-amplifiers, amplifiers, signal conditioners, or any other logic that influences an audio signal delivered to the speakers 380.

Figure 4:
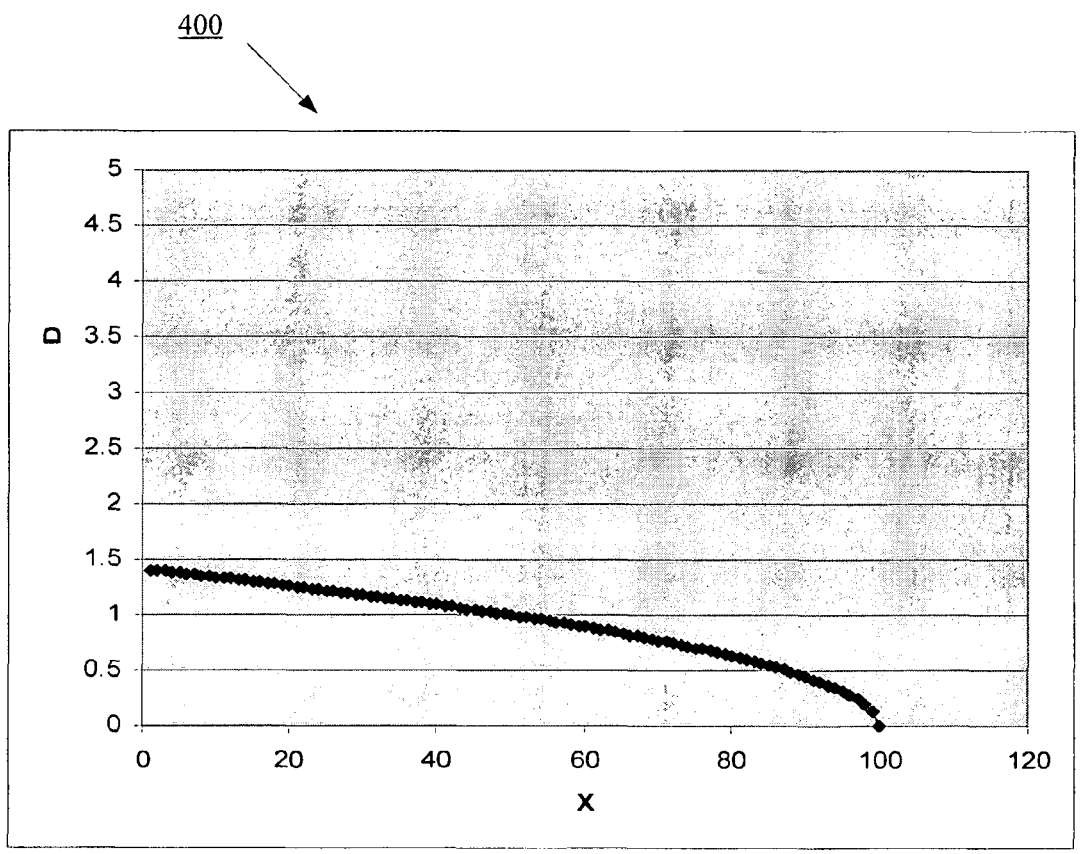
FIG. 4 is an example of heuristic distance measures.

FIG. 4 illustrates an example graph 400 of maximum heuristic distance measures as a function of the uniform random variable X. FIG. 4 is a graph of Equation 3 with K=50. The system 300 influences the selection space from which the next song will be chosen by changing the K parameter. For a song that is similar to the last song, for example, the system 300 may use a value for K of 50, such that about 50% of the maximum heuristic distances will be 1 or less, and the largest maximum distance is less than 1.5. Once the maximum distance has been determined using X and K, the music object playback logic 340 may randomly choose a music object that has a heuristic distance less than or equal to the determined maximum distance D from the current music object. The result is that subsequent music objects may be similar to the current music object. The system may select similar music objects when the listener uses the track forward control, when the currently playing song ends, or for other reasons.

Figure 5:
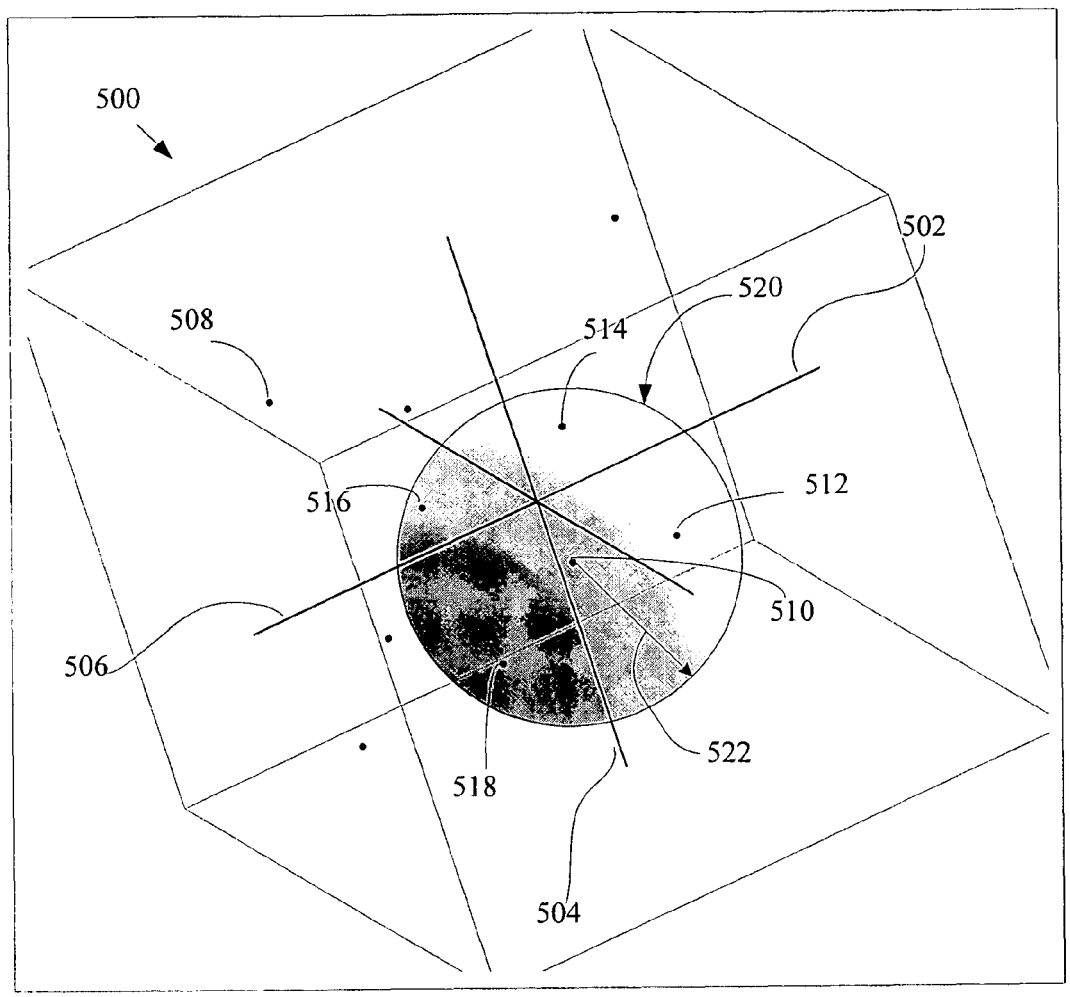
FIG. 5 is a music object selection space based on the heuristic distance measures of FIG. 4.

FIG. 5 illustrates an example three dimensional heuristic map 500. FIG. 5 labels the axes 502, 504 and 506 for each of the three dimensions. A group of music objects (several of which are labeled 508, 510, 512, 514, 516 and 518) are located in the heuristic map 500. Based on the example function illustrated in FIG. 4, a next music object selection space 520 may be represented as a sphere with a radius D 522, which may represent the maximum heuristic distance measure. The next music object selection space 518 encompasses a set of music objects (510, 512, 514, 516 and 518) that are located within the radius D 522 of a music object 510. The music object 510 may represent the currently playing music object. The radius D 522 may be determined based on the heuristic distance scaling factor, such as by using Eqn. 3. In FIG. 5, radius D 522 may be determined using a heuristic distance scaling factor of K=50, based on the example in FIG. 4. The music object playback logic 340 may randomly select a next music object to play from the music objects (510, 512, 514, 516 and 518).

The music object 508 lies outside the next music object selection space 520. Because the music object 508 is located a distance greater than radius D 522 from the music object 510, the music object 508 may be excluded from the next music object selection space 520. The music object playback logic 340 does not select music objects that lie outside the next music object selection space when the music objects, such as the music object 508 for example, are located a distance greater than the radius D 522.

Figure 6:
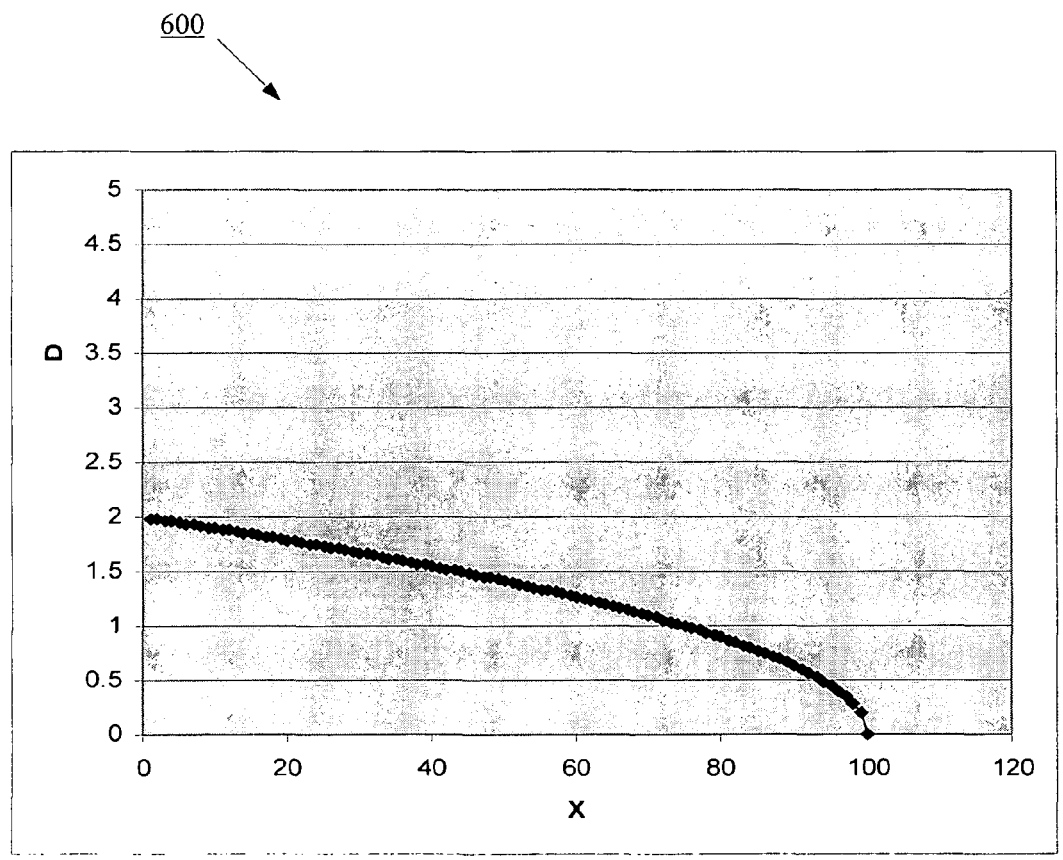
FIG. 6 is an example of heuristic distance measures.

FIG. 6 illustrates an example graph 600 of maximum heuristic distance measures, as a function of uniform random variable X, when the listener desires a next music object that is "less like" or less similar to the current playing music object. If the listener desires the next music object to be less similar or "less like" the current playing music object, the music object playback logic 340 may decrease the value of the heuristic distance scaling factor, such as by using a value for K of 25. In this case, there may be only a 20% probability that the maximum heuristic distance measure is less than 1. This probability would indicate that it may be now more likely that the next music object is less similar to the current playing music object, because the average distance between selected music objects is further. Other values for K may be selected by the music object playback logic 340.

Figure 7:
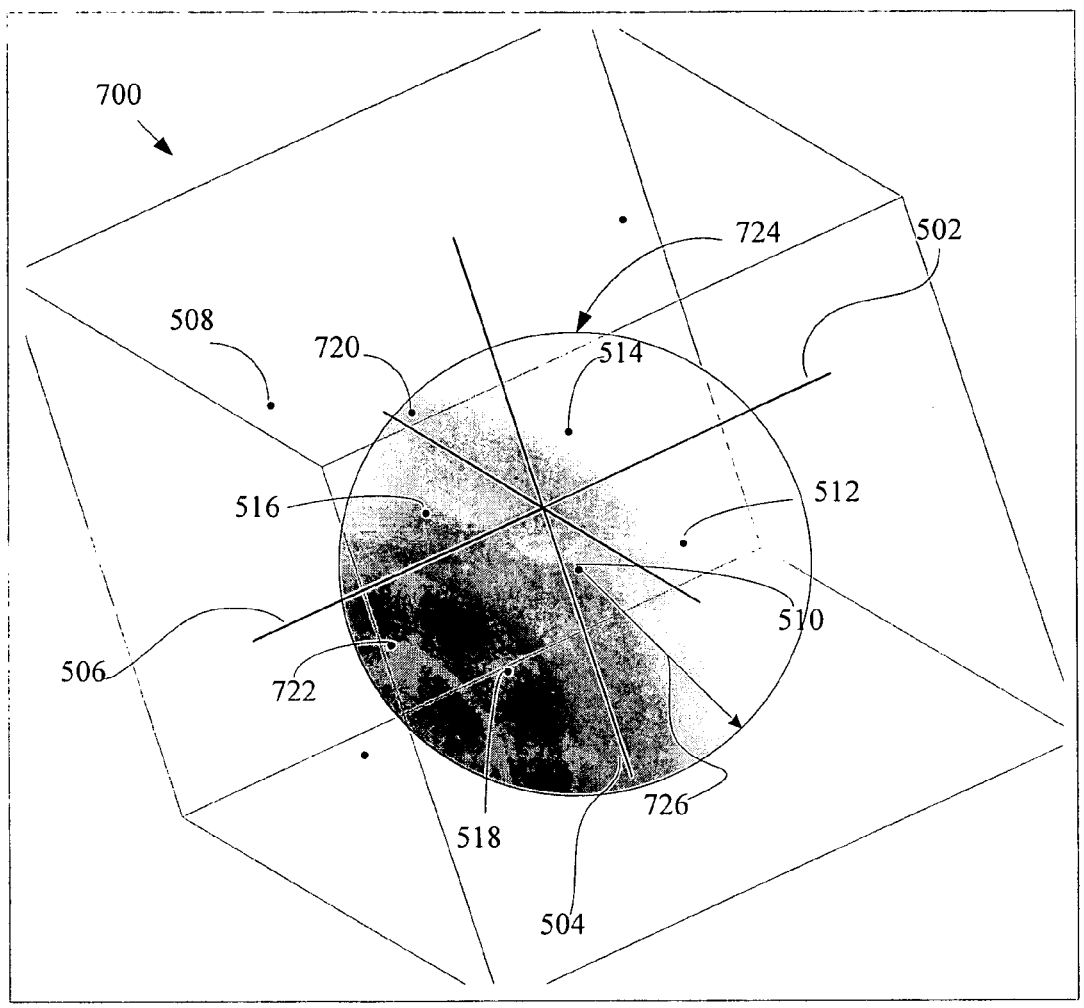
FIG. 7 is a music object selection space based on the heuristic distance measures of FIG. 6.

FIG. 7 illustrates an example heuristic map 700 based on the example graph of maximum heuristic distance measures in FIG. 6. Based on the example group illustrated in FIG. 6, a next music object selection space 724 may be represented as a sphere with a radius D 726, which may represent the maximum heuristic distance measure. The next music object selection space 724 may include a set of music objects (510, 512, 514, 516, 518, 720 and 722) that are located within the radius D 726 of a music object 510. Music object 510 may represent the currently playing music object. The radius D 726 may be determined based on the heuristic distance scaling factor, which may be decreased, based on the example in FIG. 6. In FIG. 7, the radius D 726 may be determined using a heuristic distance scaling factor of K=25, based on the example in FIG. 6. In FIG. 7, the next music object selection space 724 has been increased, including more music objects to select. The music object playback logic 340 may randomly select a next music object to play from the music objects (510, 512, 514, 516, 518, 720 and 722). The music object 508 may be excluded from the next music object selection space 724 because the music object 508 is located a distance from the music object 510 that is greater than the radius D 726, which represents the maximum heuristic distance measure for the next music object selection space 724. The music object that is selected may therefore be less similar or "less like" the currently playing music object 510 because the maximum heuristic distance measure is larger than the maximum heuristic distance measure in FIG. 5.

Figure 8:
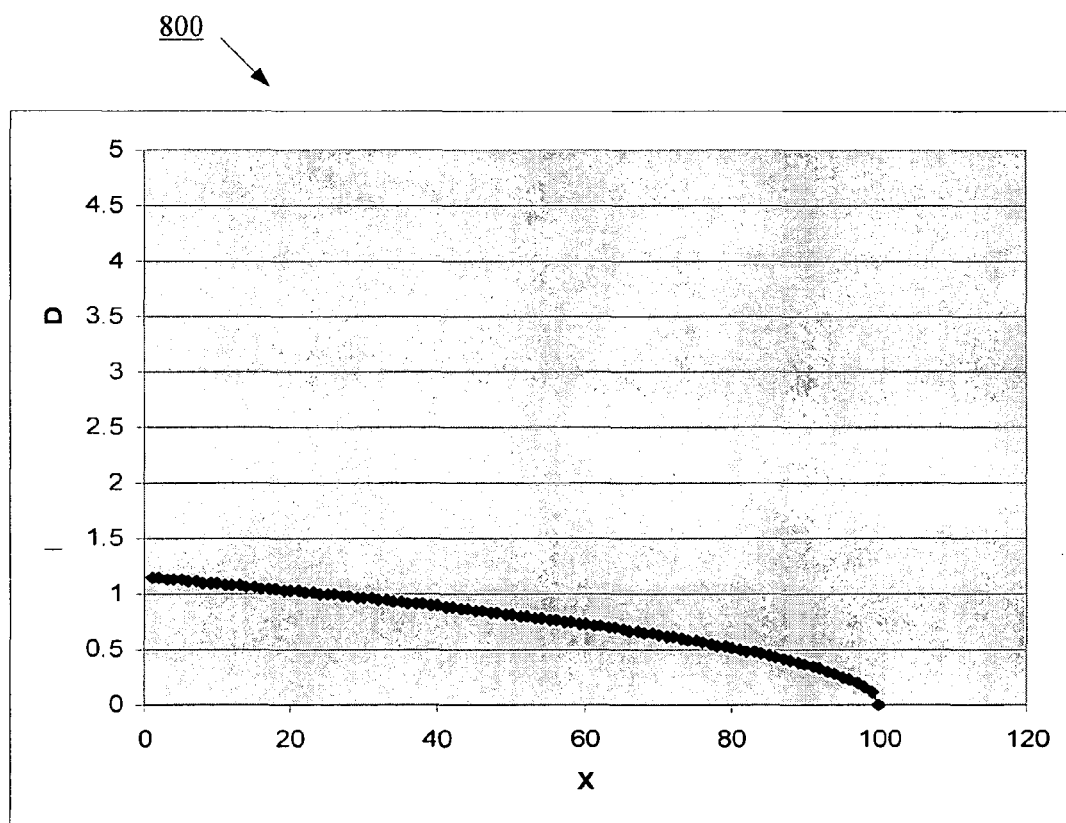
FIG. 8 is an example of heuristic distance measures.

FIG. 8 illustrates an example graph 800 of maximum heuristic distance measures when the listener desires a next music object that is "more like" or more similar to the current playing music object. If the listener desires the next music object to be "more like" or more similar to the current playing music object, the music object playback logic 340 may increase the value of the heuristic distance scaling factor, such as by using a value for K of 75. In this case, there may be an 80% probability that the maximum distance is less than 1. This probability would indicate that it is now more likely that the next music object is more similar to or "more like" the current playing music object, because the average distance between selected music objects is less. Other values for K may be selected by the music object playback logic 340.

Figure 9:
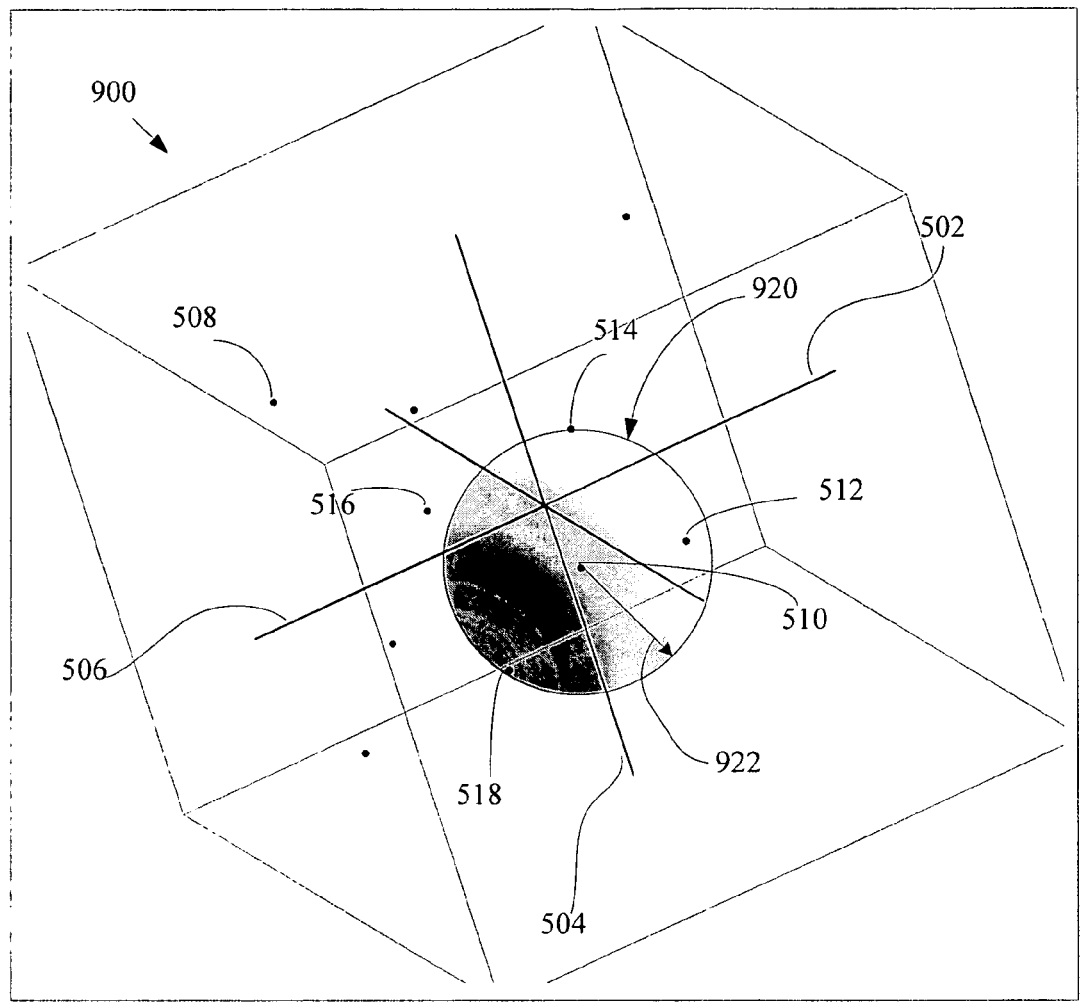
FIG. 9 is a schematic diagram of a music object selection space based on the heuristic distance measures of FIG. 8.

FIG. 9 illustrates an example heuristic map 900 based on the example graph of maximum heuristic distance measures in FIG. 8. Based on the example group illustrated in FIG. 8, a next music object selection space 920 may be represented as a sphere with a radius D 922, which may represent the maximum heuristic distance measure. The next music object selection space 920 may encompass a set of music objects (510, 512 and 518) that are located within the radius D 922 of a music object 510. The music object 510 may represent the current playing music object. The radius D 922 may be determined based on the heuristic distance scaling factor, which may be increased, based on the example in FIG. 8. In FIG. 9, the radius D 922 may be determined using a heuristic distance scaling factor of K=75, based on the example in FIG. 8. The music object playback logic 340 may randomly select a next music object to play from the music objects (512 and 518) in the next music object selection space 920. The music object playback logic 340 may select a next music object to play that is "more like" or more similar to the currently playing music object 510. The music objects 514 and 516 lie outside the next music object selection space 920. The music object playback logic 340 may not select the music objects 514 and 516 because they are located at distances from the music object 510 that are greater than the radius D 922, which may represent the maximum heuristic distance measure.

Figure 10:
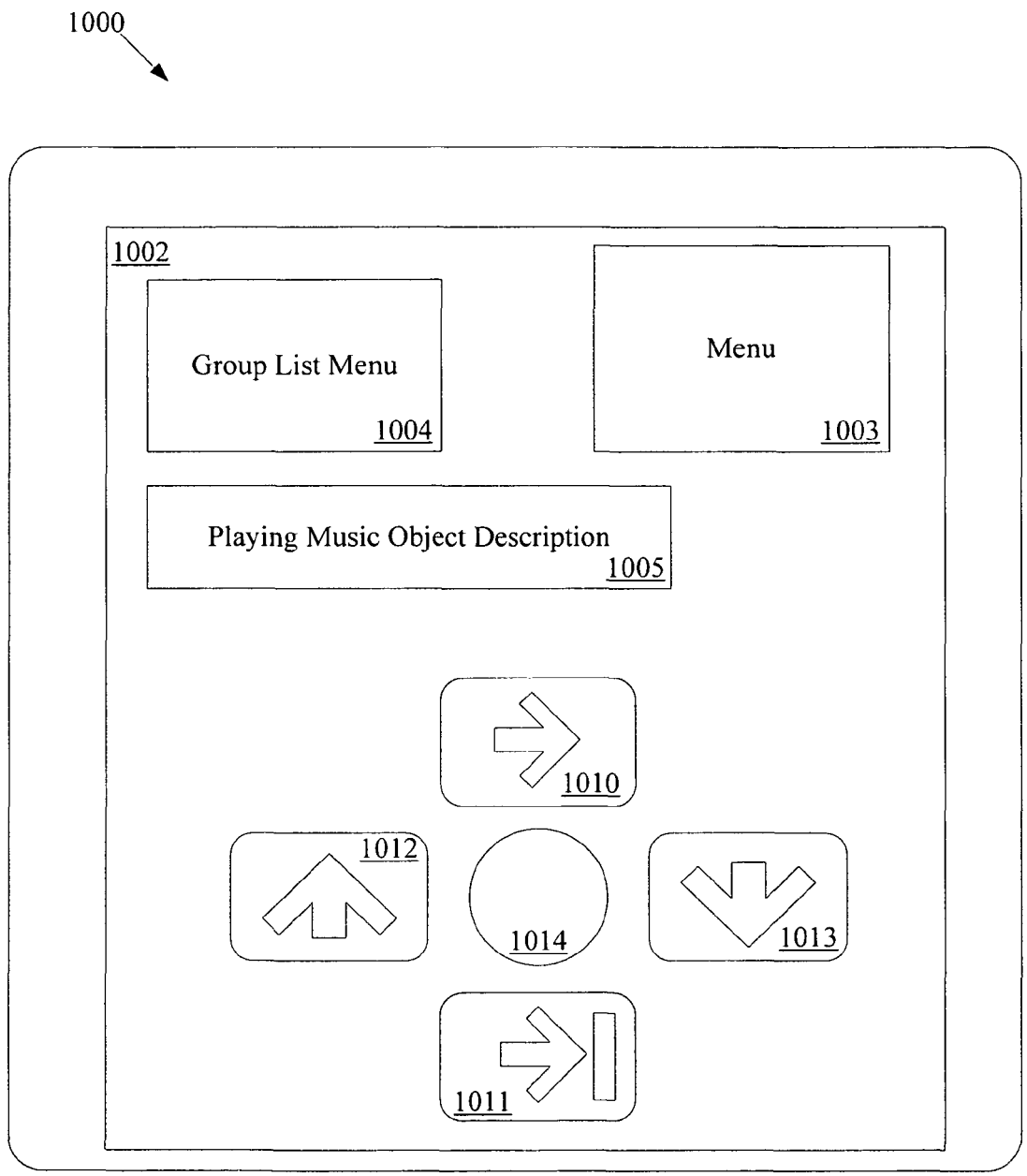
FIG. 10 illustrates a graphical user interface.

FIG. 10 illustrates an example graphical user interface 1000. The graphical user interface 1000 accepts input for the music playback system 300. The graphical user interface 1000 may be presented on a display 1002 that presents data related to applications, group listings, and music object listings. For example, the display 1002 may present windows or display panes, such as an application menu 1003, a group list menu 1004, and a playing music object description 1005. Other data may be presented. Other display formats may be adopted, such as a command line interface, a speech recognition transcription or handwriting recognition transcription pane, or other display formats. The display 1002 may receive stylus input, such as through a touch screen or tablet PC interface. The display 1002 may include the display 240, or the interface display 205.

The graphical user interface 1000 may include one or more user interface elements 1010-1014. The user interface elements 1010-1014 may be assigned functions related to playback of the organized groups of music objects. For example, the graphical user interface 1000 may include a "play to end" user interface element 1010 that allows a music object to play until completion of the music object; a "next song" user interface element 1011 that allows selecting a next music object from the group of music objects; a "more like this" user interface element 1012 that allows selecting a next music object that is more similar to or "more like" a playing music object; and a "less like this" user interface element 1013 that allows selecting a next music object that is less similar to or "less like" a playing music object. The graphical user interface 1000 may also include a user interface selector element 1014 to select other actions, to repeat a previous action, to access other data display options, and/or other options. The user interface elements 1010-1014 may be defined in a liquid crystal display, or configured as a raster image on a pixelated CRT screen.

When the listener selects the user interface elements 1010 or 1011, the system 300 may select the next music object from the existing music object selection space. For example, the system 300 may determine the heuristic distance scaling factor K to be 50, such that about 50% of the maximum heuristic distance measures will be of 1 or less, and the largest maximum distance is less than 1.5. Once the maximum distance D has been chosen, a music object is randomly chosen that has a maximum heuristic distance measure less than or equal to D from the current music object. As a result, subsequent music objects may be similar to the current music object.

When the listener selects the "more like this" user interface element 1012, the system 300 may select the next music object by reducing the next music object selection space. FIG. 9 shows an example of reducing the selection space, from the original space 520 to the reduced space 920. The system 300 may adjust the heuristic distance scaling factor K, such as by increasing K to be 75, for example. Other values of K may be used. The next music object may be more similar to the current playing music object, because the average distance between selected music objects is less.

When the listener selects the "less like this" user interface element 1013, the system 300 may select the next music object by expanding the next music object selection space. FIG. 7 shows an example of expanding the selection space, from the original space 520 to the expanded space 724. The system 300 may adjust the heuristic distance scaling factor K, such as by decreasing K to be 25, for example. Other values of K may be used. The next music object is less similar to the current playing music object, because the average distance between selected music objects is greater.

Figure 11:
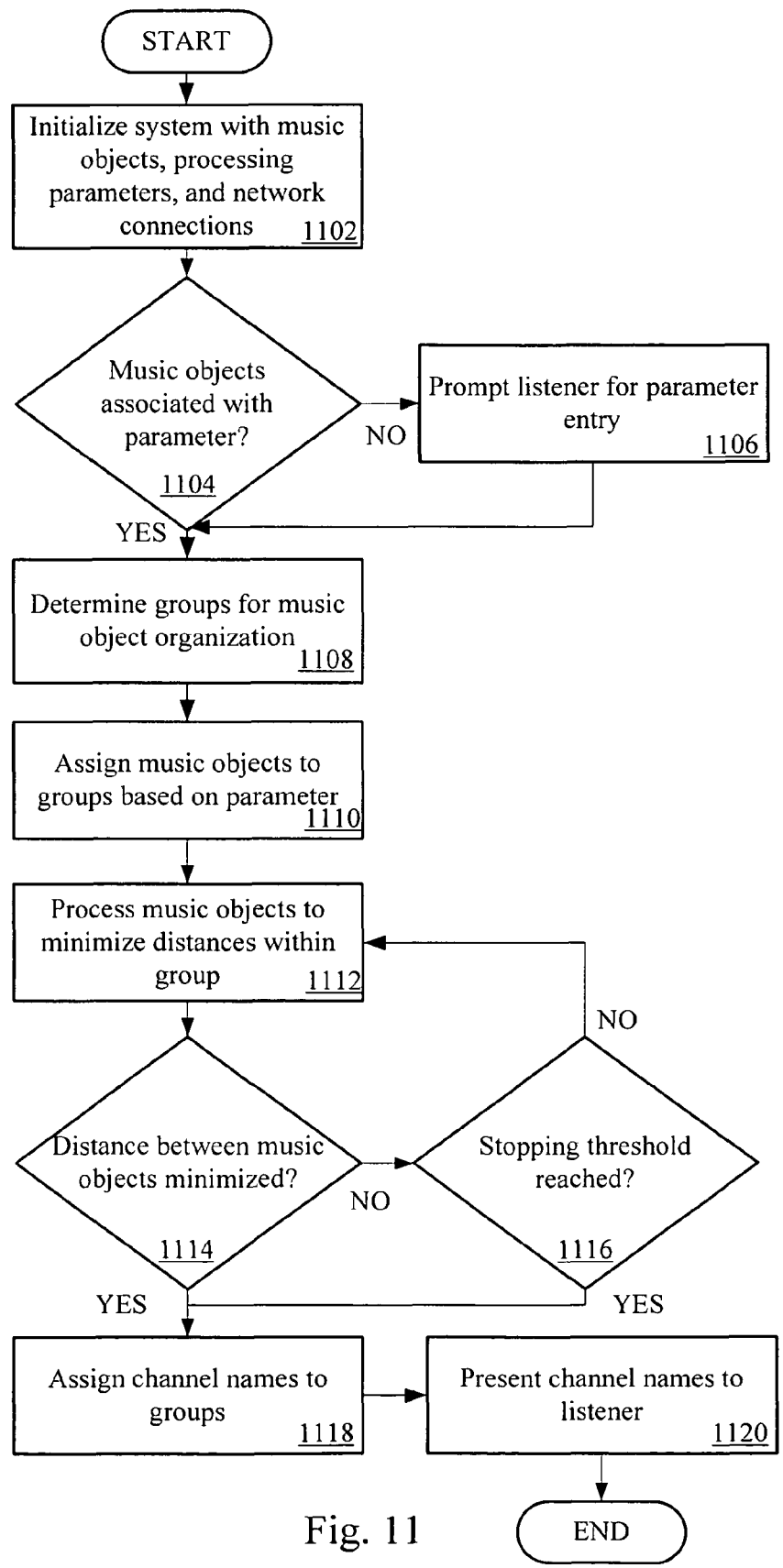
FIG. 11 shows the acts the music object organization system takes to group music objects based on a music object characteristic.

FIG. 11 illustrates the acts the music object organization system 200 takes to group music objects based on a music object characteristic. The acts illustrated in FIG. 11 may be implemented by the elements of FIG. 2, such as the processor 202, the co-processor 203, instructions or logic retained in the system memory 206, the databases 208, and/or programs or logic retained in modules coupled with the system 200. For example, the organization logic 230 may be implemented with processor executable instructions that implement the acts shown in FIG. 11 when executed by the processor 202. The system 200 may initialize by loading music objects, processing music object characteristics and/or network connections (Act 1102). The system 200 may prompt for user input during initialization, or the system 200 may execute a boot script to initialize. The system 200 may determine if the music objects are associated with a music object characteristic (Act 1104). The system 200 may determine if the music objects are tagged or associated with a genre, artist, album, composer, beats-per-minute measure, music object length, time period and/or a user-defined field. The system 200 may process an ID3 tag or other metadata container associated with the music objects.

If the music objects are not associated with a music object characteristic, the system 200 may prompt the listener to enter music object characteristics for the music objects (Act 1106). In some systems, the listener may be prompted to locate a data file containing music object characteristics to associate with the music objects, or to select an ID3 tag or other identifier containing music object characteristics. If the music objects are associated with a music object characteristic, the system 200 may determine an initial set of groups based on the music object characteristic (Act 1108). The system 200 may use the initial groups to assign music objects to the groups based on the music object characteristics associated with the music objects (Act 1110). The listener may be prompted to select a music object characteristic to use for the initial groups. In some systems, the system 200 uses a determined music object characteristic and/or a heuristic map to determine the initial groups.

When the initial groups are determined, the system 200 processes the music objects to satisfy a clustering criterion for the music objects, such as to minimize a heuristic distance measure between the music objects within the group (Act 1112). As discussed above, the system 200 may use an expectation-maximization process, such as a K-means process, to process the music objects. The system 200 processes the music objects, as represented in a vector space determined by the music object characteristic associated with the music object, to minimize the heuristic distance measure. The heuristic distance measure between any two music objects in the vector space may be defined as a geometric distance between the music objects, such as a scalar magnitude of a vector between the two music objects in the vector space, or other measure.

The system 200 may, at a stage of the processing, determine if the heuristic distance measures between the music objects within the group are minimized (Act 1114). If the heuristic distance measures are minimized, the system 200 may complete the processing. The system 200 may assign channel names to the groups of music objects (Act 1118). The system 200 may assign heuristic names to the groups of music objects based on the heuristic map, from a list of channel names associated with the groups of music objects, or by operator selection. The system 200 may present the channel names to the listener on a GUI for selection (Act 1120). If the heuristic distance measures are not minimized, the system 200 may determine if a determined stopping threshold has been reached (Act 1116). The system 200 may use a maximum number of process iterations to determine when to stop the object assignment process. The system 200 may use the determined stopping threshold to prevent the system 200 from iterating without bound. The system 200 may return an error message if the stopping threshold has been reached. The system 200 may then present the group of music objects as determined by the system 200 at the time the system 200 ends processing. If the stopping threshold has not been reached, the system 200 may continue to Act 1112 to process the music objects.

Figure 12:
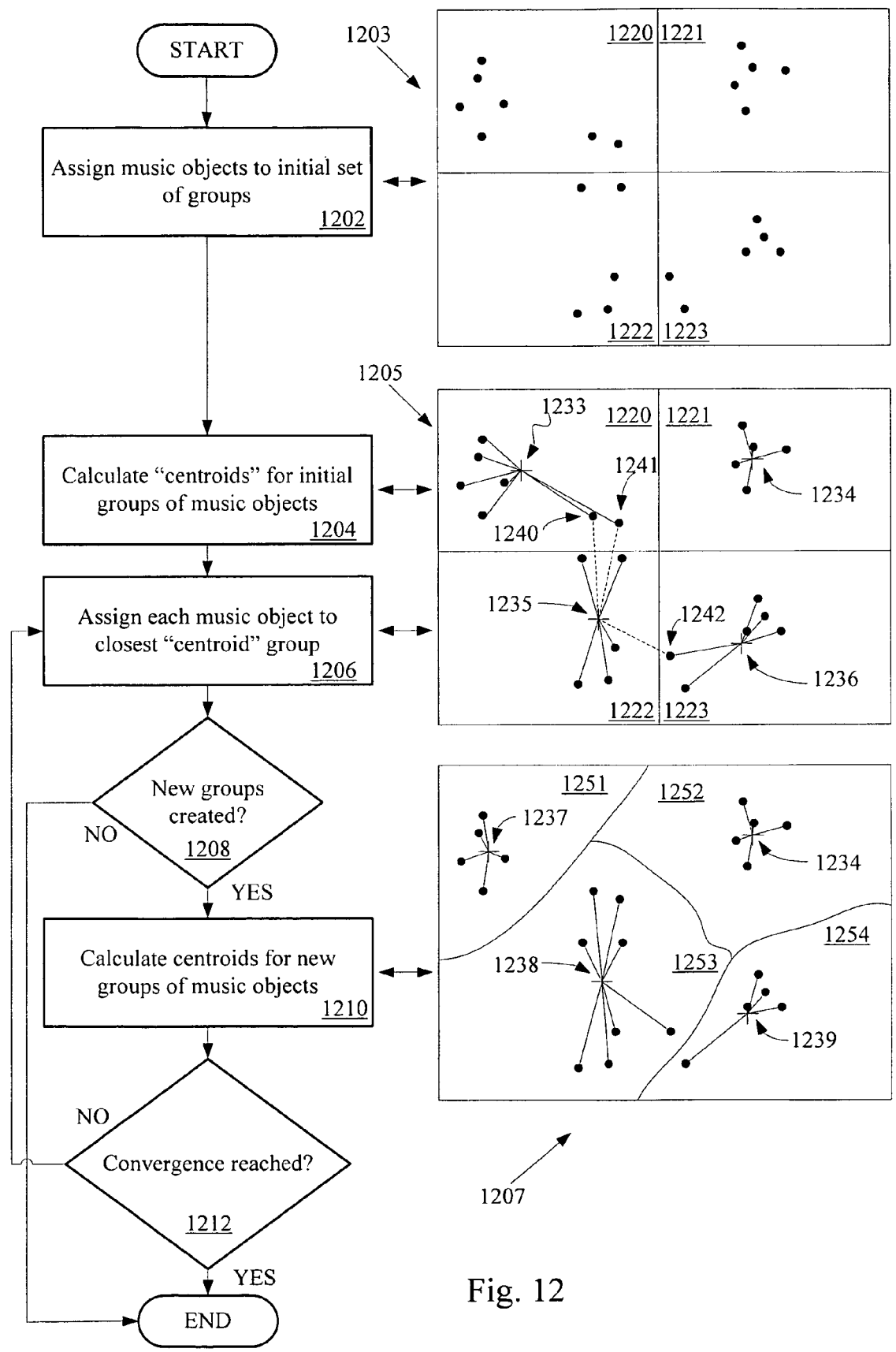
FIG. 12 shows the acts the music object organization system takes to satisfy a clustering criterion for the music objects.

FIG. 12 shows the acts the music object organization system takes to satisfy a clustering criterion for the music objects. The system 200 may use a K-means process to assign the music objects. The system 200 assigns music objects to an initial set of groups (Act 1202). The system 200 may use a heuristic map, such as example heuristic map 100, to assign the music objects to the initial set of groups. The system 200 may use music object characteristics associated with the music objects to determine the initial groups. Alternatively, the system 200 may prompt the listener to select a list of initial groups. Vector space diagram 1203 illustrates four groups (1220-1223) of music objects. For example, based on the initial list of groups, there are seven music objects initially assigned to group 1220, five music objects initially assigned to group 1221, five music objects initially assigned to group 1222, and six music objects initially assigned to group 1223. Other initial groupings may be possible.

The four groups (1220-1223) may represent genres of the music objects. Example genres include, but are not limited to, pop, oldies, country, alternative, rock, classical, hip-hop, rap, jazz, opera, contemporary, heavy metal, or other genres. The genres may be determined by an ID3 tag, metadata container, or other identifier associated with the music objects, or may be determined based on listener input. The four groups (1220-1223) may represent other music object characteristics, such as an artist, album, composer, music object length, beats-per-minute count, time period, tempo, a user-defined field, or other music object characteristics. The number of possible groups in the vector space is likewise not limited to four, but may include lesser or greater numbers of groups.

The system 200 may calculate a "centroid" measure for each group of music objects, based on the initial groups (Act 1204). Vector space diagram 1205 illustrates the four centroids of the music objects in the initial groups (1220-1223), illustrated as crosses (1233-1236). The centroid for each group may be determined using a relation such as:

$$Cg, x = \sum_{i=1}^{n} \frac{w_i * x_i}{n} \quad \text{Eqn. 4}$$

$$Cg, y = \sum_{i=1}^{n} \frac{w_i * y_i}{n} \quad \text{Eqn. 5}$$

Eqn. 4 represents the x-coordinate of the centroid of the group g, and Eqn. 5 represents the y-coordinate of the centroid of the group g, where (x,y) are coordinates locating the music objects in the vector space determined by the music object characteristics, and n is the number of music objects in group g. Eqns. 4-5 may use a weighting factor wi for each music object. The weighting factor wi may represent a rating, importance factor, or other scaling factor desired by the listener. The system 200 may use ethnomusical preferences, such as maintaining the track order within a performance (e.g., track order in an opera). The weighting factor wi may be adapted to place a next logical track in an album closer in distance than other tracks. The weighting factor wi may take on a value of 1. In FIG. 12, centroid 1233 represents the centroid of the music objects for group 1220, centroid 1234 represents the centroid of the music objects for group 1221, centroid 1235 represents the centroid of the music objects for group 1222, and centroid 1236 represents the centroid of the music objects for group 1223. Distances between the centroids (1233-1236) and the music objects within a group are represented as solid lines.

The system 200 then assigns each music object to a group associated with a closest centroid (Act 1206). Vector space diagram 1205 illustrates an illustrative situation where three music objects are closer to a different initial group's centroid (indicated by dashed lines between a music object and a centroid). Music objects 1240 and 1241 are closer to the centroid of group 1222 than to the centroid of group 1220. Music object 1242 is also closer to the centroid of group 1222 than to the centroid of group 1223. The system 200 then assigns music objects 1240 and 1241 to group 1222, and assigns music object 1242 to group 1222. Other sets of music objects and music object characteristics may generate different placements of the music objects, and different distances between the music objects and the centroids of the groups.

The system 200 may determine if new groups are created based on assigning each music object to the group associated with a closest centroid (Act 1208). If no new groups are created, then the system 200 may determine that the music objects within the groups are assigned such that the heuristic distance measures between the music objects are minimized, and the process ends. The groups may be determined to be the groups to present to the listener for selection.

If new groups are created based on assigning each music object to the group associated with a closest centroid, then the system 200 may calculate centroids for the newly created groups (Act 1210). The system 200 may use Eqns.4-5 to determine the new centroids. Vector space diagram 1207 illustrates example new groups (1251-1254) based on the re-assigned music objects from vector space diagram 1205 and Act 1206. Newly determined centroids (1230, 1234, 1237 and 1238) are illustrated in vector space diagram 1207, along with vectors (indicated by solid lines) representing distances between the music objects and the centroids (1230, 1234, 1237 and 1238). The system 200 may then determine if convergence of the process has been reached (Act 1212). For the k-means process, convergence may be reached when no music object switches groups during a process iteration. Alternatively, convergence may be reached when centroid positions do not change after assigning the music objects to the nearest centroids and re-calculating the centroids. If convergence is not reached, the system 200 continues with Act 1206, where the system 200 assigns each music object to the closest centroid associated with a group. In vector space diagram 1207, as an example, no music objects change groups. Therefore, convergence will be reached after the next iteration and the process ends. In other example music object configurations, music objects may switch groups over several iterations. The system 200 may also use a stopping threshold to prevent the system 200 from boundless iterations. The system 200 may use a determined maximum number of iterations before terminating the process. Other expectation-maximization processes may use different steps or use different criterion for terminating the process.

Figure 13:
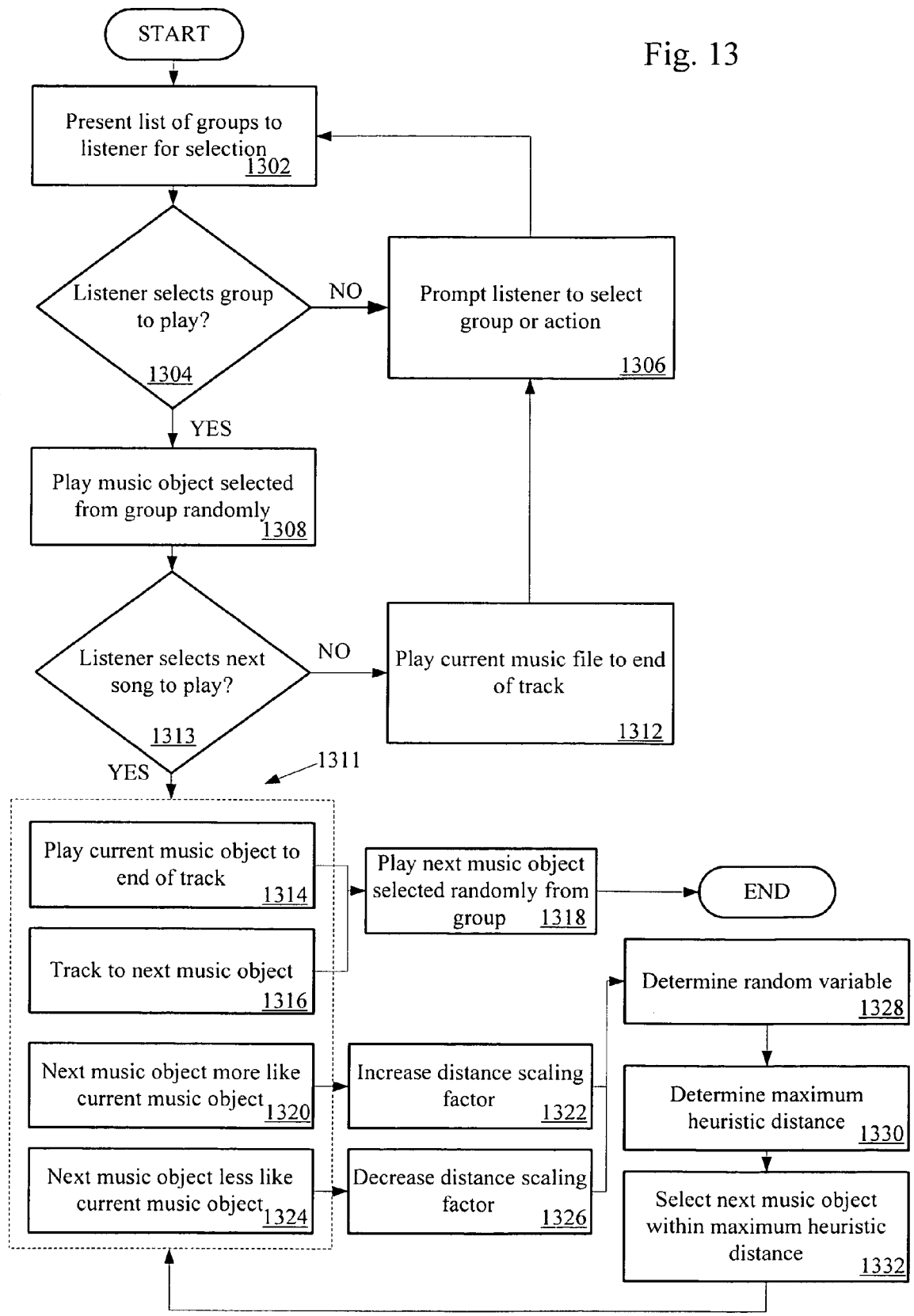
FIG. 13 shows the acts the music object playback system takes to select and play a next music object.

FIG. 13 shows the acts the music object playback system takes to select and play a next music object. The acts illustrated in FIG. 13 may be implemented by the elements of system 300, such as the processor 202, the co-processor 203, instructions or logic retained in the system memory 306, the databases 308, or retained in a computer-readable medium interfaced or coupled with the system 300. After the music objects are organized based on the music object characteristic, as described in FIG. 11, the system 300 may present a list of groups of music objects for the listener to select (Act 1302). The system 300 may present the list on the display 240, the user interface 304, or may output the list as an aural output on the speakers 380. The system 300 may determine if the listener selects a group from the list of groups (Act 1304). The system 300 may receive listener input through the user interface 304, such as through selectors 307 or other user input 309. If the listener does not select a group, the system 300 may prompt the listener to select a group from which to play music objects (Act 1306). The system 300 may then present the list of groups again. In some systems, the system 300 randomly selects a group to play. In other systems, the system 300 may use a heuristic factor to select a group to play, such as a previously played group, a group that is rated by the listener, or from a playlist.

When the listener selects a group to play, the system 300 randomly selects a music object from the group for playback (Act 1308). The system 300 may play the music object over the speakers 380. In some systems, the system 300 selects the music object to play based on a heuristic factor, such as a previously played group, a group that is rated by the listener, or from a playlist. The system 300 may then determine when the listener selects a next music object to play from the group (Act 1313). If the listener does not select a next music object to play, the system 300 may play the current music object until the end of the music object track ("EOT") (Act 1312). In some systems, the system 300 prompts the listener to take an action to select the next music object.

When the listener selects a next music object to play, the listener is presented with at least four actions to select from (Block 1311). The listener may play the current music object to EOT (Act 1314). The listener may track to the next music object (Act 1316). The listener may select a next music object that is "more like," or more similar, to the current playing music object (Act 1320). The listener may select a next music object that is "less like," or less similar, to the current playing music object (Act 1324).

When the listener desires to play the current music object to EOT, or if the listener desires to track to the next music object, the system 300 randomly selects the next music object from within the group of music objects (Act 1318). As discussed above, the system 300 may also select the next music object based on a heuristic factor. When the listener desires to select a next music object that is "more like," or more similar to the current playing music object, the system 300 may determine the next music object by reducing the next music object selection space, such as by increasing a heuristic distance scaling factor associated with the group of music objects (Act 1322). When the listener desires to select a next music object that is "less like," or less similar to the current playing music object, the system 300 may determine the next music object by expanding the next music object selection space, such as by decreasing a heuristic distance scaling factor associated with the group of music objects (Act 1326).

The system 300 then may determine a uniform random variable (Act 1328). The system 300 may use a random number generator, a seed function, a look-up table, and/or other processes to determine a uniform random number. The system 300 may determine a maximum heuristic distance measure based on the uniform random number and the heuristic distance scaling factor (Act 1330). In some systems, the system 300 uses a square root function of the uniform random number and the heuristic distance scaling factor, such as by determining Eqn. 3 above. The system 300 may select the next music object to play using the maximum heuristic distance measure (Act 1332). For example, if the listener desires a next music object more similar to or "more like" the current music object, the maximum heuristic distance measure is less than for a desired next music object that is less similar to or "less like" the current music object. The next music object is more likely to be similar to the current playing music object if the maximum heuristic distance measure is smaller than for a desired next music object less similar to the current music object. The maximum heuristic distance measure may also be adjusted to take into account ethnomusical preferences, such as maintaining the track order within a performance (e.g., track order in an opera). The system 300 may place the next logical track in an album closer in distance than other tracks. The system 300 may then continue with further actions selected by the listener from Block 1311.

The music object organization system 200 may be adapted to process other types of object formats. The system 200 may be adapted to organize multimedia objects such as video or picture object formats, including WMV, MPEG, JPEG, GIF, BMP, AVI, TIFF, or other multimedia object formats. The multimedia object formats may be associated with an object characteristic that may be used to organize the objects heuristically. For example, video or picture objects may be associated with an object characteristic associated with events (e.g. vacation, birthday, graduation, sporting events, or other events), locations, time recorded, object content (e.g., museum exhibits, still life, action, people, animals, nature or other content indicia), and/or other object characteristics. The system 200 may be adapted to organize the multimedia objects based on the object characteristics using the process described in FIG. 11. The playback system 300 may also be adapted to present the multimedia objects using similar playback actions.

The systems 200 and 300 may also be adapted for other multimedia object content, such as entry objects in address books or phone books. Instead of a flat list, or a most recently called list, the system 200 may be adapted to group phone numbers together by how the user has statistically called them. Once enough statistics have been gathered, the system 200 may generate groups like 'Friends', 'Work', 'Restaurants', etc.

The methods shown in FIGS. 11-13 may be encoded in a computer readable medium such as a memory, programmed within a device such as one or more integrated circuits, or processed by a controller or a computer. If the methods are performed by software, the software may reside in a memory resident to or interfaced to the music object organization system 200, the music object playback system 300, a communication interface, or any other type of non-volatile or volatile memory interfaced or resident to the system memory 204 or 304. The memory may include executable instructions for implementing logical functions. Logic or a logical function may be implemented through digital circuitry, processor executable instructions, through analog circuitry, or through an analog source such as through an analog electrical, audio, or video signal. Executable instructions may be embodied in any computer-readable, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "product," and/or "computer program product," may comprise any means that contains, stores, communicates, or transports software for use by or in connection with an instruction executable system, apparatus, or device. The machine-readable medium may selectively be, but is not limited to, an electronic, magnetic, optical, electromagnetic, infrared, or semiconductor system, apparatus, or device. A non-exhaustive list of examples of a machine-readable medium includes: an electrical connection having one or more wires, a portable magnetic or optical disk, a volatile memory such as a Random Access Memory "RAM" (electronic), a Read-Only Memory "ROM" (electronic), or an Erasable Programmable Read-Only Memory (EPROM or Flash memory) (electronic). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A music object organization system, comprising:
a processor; and
music object organization logic configured to be executed by the processor, the music object organization logic configured to:
determine a first music object group and a second music object group based on a music object characteristic;
identify a heuristic distance measure applicable to the music objects; and
assign the music objects among the first music object group and the second music object group such that the heuristic distance measure between the music objects within the group satisfies a clustering criterion.

2. The music object organization system of claim 1 where the clustering criterion comprises a minimization of the heuristic distance measure between the music objects in the first group and a minimization of the heuristic distance measure between the music objects in the second group.

3. The music object organization system of claim 2 further comprising a memory operably coupled with the music object organization logic and comprising an n-tuple ordering of the music objects in a characteristic-based vector space, where the heuristic distance measure comprises a geometric distance between the music objects.

4. The music object organization system of claim 3 where the heuristic distance measure comprises a similarity measure between the music objects.

5. The music object organization system of claim 2 where the music object organization logic is operable to initiate execution of an expectation-maximization process that assigns the music objects, based on the ordered n-tuples.

6. The music object organization system of claim 5 where the expectation-maximization process comprises a k-means process.

7. The music object organization system of claim 1 where the music object characteristic comprises a genre characteristic, an artist characteristic, an album characteristic, a composer characteristic, a period characteristic, a beat count characteristic, a listener-defined characteristic related to the music object, or any combination thereof.

8. The music object organization system of claim 1 where the music object organization logic is operable to extract the music object characteristic from an ID3 tag associated with the music object.

9. The music object organization system of claim 1 further comprising user interface generation logic operable to display a music object group selector.

10. A music object playback system, comprising:
a computer-readable medium configured to store a group of music objects, the group organized based on a music object characteristic associated with the music objects such that a heuristic distance measure between the music objects satisfies a clustering criterion in a vector space determined by the music object characteristic;
user interface generation logic operable to display a music object group selector;
music object playback logic operable to select a next music object to play from the group of objects by adjusting a next music object selection space based on a determined maximum heuristic distance measure
based on an input from the user interface; and
a loudspeaker that outputs a currently playing music object.

11. The music object playback system of claim 10 where the clustering criterion comprises a minimization of the heuristic distance measure between the music objects in the group.

12. The music object playback system of claim 10 where the music object playback logic is further operable to select the next music object to play by randomly selecting the next music object from the group of music objects or to play the currently playing music object until an end of the currently playing music object.

13. The music object playback system of claim 11 where the heuristic distance measure comprises a geometric distance between the music objects within the vector space.

14. The music object playback system of claim 10 where the determined maximum heuristic distance measure is related to a heuristic distance scaling factor, the heuristic distance scaling factor determined based on input from the user interface.

15. The music object playback system of claim 14 where music object playback logic selects a next music object that is more like the currently playing music object by reducing the next music object selection space.

16. The music object playback system of claim 15 where the music object playback logic reduces the next music object selection space by increasing the heuristic distance scaling factor.

17. The music object playback system of claim 16 where the music object playback logic randomly selects the next music object within the determined maximum heuristic distance measure in the next music object selection space.

18. The music object playback system of claim 14 where music object playback logic selects a next music object that is less like the currently playing music object by increasing the next music object selection space.

19. The music object playback system of claim 18 where the music object playback logic increases the next music object selection space by decreasing the heuristic distance scaling factor.

20. The music object playback system of claim 18 where the music object playback logic randomly selects the next music object within the determined maximum heuristic distance measure in the next music object selection space.

21. A product for selecting a next object for playback, the product comprising:
a machine-readable medium;
a group of music objects organized based on a music object characteristic associated with the music objects such that a heuristic distance measure between the music objects satisfies a clustering criterion for an ordering of the music objects in a vector space determined by the music object characteristic;

display instructions stored in the machine-readable medium that initiate display of a "more like this" user interface element through which an operator reduces a next music object selection space; and display instructions stored in the machine-readable medium that initiate display of a "less like this" user interface element through which an operator expands the next music object selection search space.

22. The product of claim 21 where the heuristic distance measure includes a geometric distance between the music objects in the vector space.

23. The product of claim 22, where the display instructions that initiate display of a "more like this" user interface element further comprise selection instructions that reduce the next music object selection space by increasing a heuristic distance scaling factor.

24. The product of claim 23 where the selection instructions are further operable to randomly select a next music object to play from the group of music objects within a determined maximum heuristic distance measure from a current music object, the determined maximum heuristic distance based on the heuristic distance scaling factor.

25. The product of claim 22, where the display instructions that initiate display of a "more like this" user interface element further comprise selection instructions that reduce the next music object selection space by increasing a heuristic distance scaling factor.

26. The product of claim 25 where the selection instructions are further operable to randomly select a next music object to play from the group of music objects within a determined maximum heuristic distance measure from a current music object, the determined maximum heuristic distance based on the heuristic distance scaling factor.

27. The product of claim 21 where the product further comprises:

display instructions stored in the machine-readable medium that initiate display of a "track to next" user interface element configured to randomly select a next music object from the group of music objects; and display instructions stored in the machine-readable medium that initiate display of a "play to end of track" user interface element configured to play a current music object until completion of the current music object.

28. A multimedia object organization system, comprising: multimedia object organization logic operable to:

determine a first multimedia object group and a second multimedia object group based on a multimedia object characteristic;

identify a heuristic distance measure applicable to the multimedia objects; and assign the multimedia objects among the first multimedia object group and the second multimedia object group such that the heuristic distance measure between the multimedia objects within the group satisfies a clustering criterion.

29. The multimedia object organization system of claim 1 where the clustering criterion comprises a minimization of the heuristic distance measure between the multimedia objects in the first group and a minimization of the heuristic distance measure between the multimedia objects in the second group.

30. The multimedia object organization system of claim 29 further comprising a memory operably coupled with the multimedia object organization logic and comprising an n-tuple ordering of the multimedia objects in a characteristic-based vector space, where the heuristic distance measure comprises a geometric distance between the multimedia objects.

31. The multimedia object organization system of claim 30 where the heuristic distance measure comprises a similarity measure between the multimedia objects.

32. The multimedia object organization system of claim 29 where the multimedia object organization logic is operable to initiate execution of an expectation-maximization process that assigns the multimedia objects based on the ordered n-tuples.

33. The multimedia object organization system of claim 32 where the expectation maximization process comprises a k-means process.

34. The multimedia object organization system of claim 28, where the multimedia objects comprise a video object, a picture object, a phonebook entry object, an address book object, or a combination thereof.

* * * * *